(12) United States Patent
Sudoh et al.

(10) Patent No.: US 8,920,765 B2
(45) Date of Patent: Dec. 30, 2014

(54) GRAPHITE MATERIAL, METHOD FOR PRODUCING SAME, CARBON MATERIAL FOR BATTERY ELECTRODES, AND BATTERY

(71) Applicant: Showa Denko K. K., Minato-ku, Tokyo (JP)

(72) Inventors: Akinori Sudoh, Tokyo (JP); Yuuichi Kamijou, Tokyo (JP); Masako Tanaka, Tokyo (JP); Tomohiro Abe, Tokyo (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 14/349,960

(22) PCT Filed: Oct. 5, 2012

(86) PCT No.: PCT/JP2012/075891
§ 371 (c)(1),
(2), (4) Date: Apr. 4, 2014

(87) PCT Pub. No.: WO2013/051678
PCT Pub. Date: Apr. 11, 2013

(65) Prior Publication Data
US 2014/0231707 A1 Aug. 21, 2014

(30) Foreign Application Priority Data
Oct. 6, 2011 (JP) .................................. 2011-221657

(51) Int. Cl.
| | | |
|---|---|---|
| *C01B 31/04* | (2006.01) | |
| *H01M 4/96* | (2006.01) | |
| *H01M 4/583* | (2010.01) | |
| *H01M 4/133* | (2010.01) | |
| *H01M 4/587* | (2010.01) | |
| *H01B 1/04* | (2006.01) | |

(52) U.S. Cl.
CPC .............. *H01M 4/133* (2013.01); *C01B 31/04* (2013.01); *H01M 4/587* (2013.01); *Y02E 60/122* (2013.01)
USPC ........ 423/448; 423/402; 252/182.1; 252/502; 429/231.8; 429/231.95; 429/188

(58) Field of Classification Search
None
See application file for complete search history.

(56) References Cited

U.S. PATENT DOCUMENTS

| | | | |
|---|---|---|---|
| 4,245,515 A | 1/1981 | Iwaya | |
| 5,587,255 A | 12/1996 | Sonobe et al. | |
| 6,632,569 B1 | 10/2003 | Kameda et al. | |
| 7,829,222 B2* | 11/2010 | Takei et al. | ................ 429/231.4 |
| 8,211,571 B2* | 7/2012 | Takei et al. | ................ 429/231.8 |
| 2011/0045354 A1* | 2/2011 | Takei et al. | ................ 429/231.8 |
| 2014/0205532 A1* | 7/2014 | Takeuchi et al. | ............. 423/448 |
| 2014/0255292 A1* | 9/2014 | Wakizaka et al. | ............. 423/448 |

FOREIGN PATENT DOCUMENTS

| | | |
|---|---|---|
| JP | 56-500534 A | 4/1981 |
| JP | 7-257915 A | 10/1995 |
| JP | 7-320740 A | 12/1995 |
| JP | 9-180721 A | 7/1997 |
| JP | 2000-340232 A | 12/2000 |
| JP | 3534391 B2 | 6/2004 |

OTHER PUBLICATIONS

Hideharu Niwa, et al., "X-ray photoemission spectroscopy analysis of N-containing carbon-based cathode catalysts for polymer electrolyte fuel cells", Journal of Power Sources, Feb. 1, 2011, pp. 1006-1011, vol. 196, No. 3.
F.F. Kurp, et al., "Electron momentum density of graphite from (y,ey) spectroscopy", Nuclear Instruments and Methods in Physics Research B, 1997, pp. 269-273, vol. 122.

* cited by examiner

*Primary Examiner* — Joseph D Anthony
(74) *Attorney, Agent, or Firm* — Sughrue Mion, PLLC

(57) ABSTRACT

A graphite material suitable as an electrode material for non-aqueous electrolytic secondary batteries; a method for producing the same and a carbon material for battery electrodes; and a secondary battery. The graphite material includes crystallite graphite particles wherein an oxygen amount (a) (mass %) in a region from a particle surface of the graphite material to a depth of 40 nm is within a range of $0.010 \leq (a) \leq 0.04$ as determined by a peak intensity of $O_{1s}$ obtained by HAX-PES measurement using a hard X-ray of 7,940 eV.

17 Claims, 1 Drawing Sheet

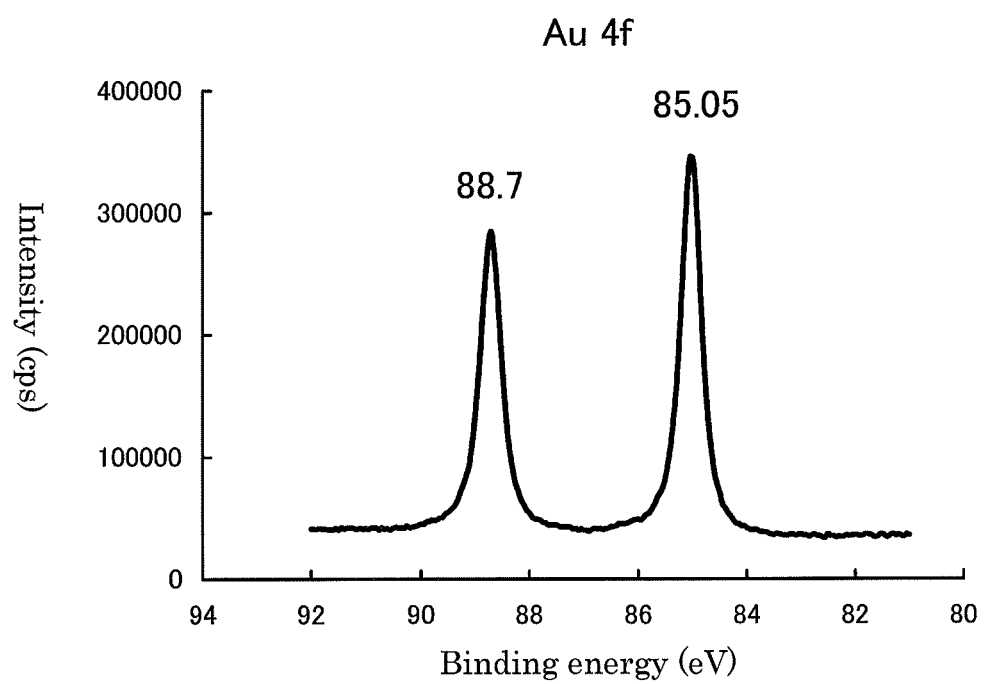

GRAPHITE MATERIAL, METHOD FOR PRODUCING SAME, CARBON MATERIAL FOR BATTERY ELECTRODES, AND BATTERY

CROSS REFERENCE TO RELATED APPLICATIONS

This application is a National Stage of International Application No. PCT/JP2012/075891, filed Oct. 6, 2012, claiming priority from Japanese Patent Application No. 2011-221657, filed Oct. 6, 2011, the contents of all of which are incorporated herein by reference in their entirety.

TECHNICAL FIELD

The present invention relates to a graphite material, a carbon material for a battery electrode, and a battery. More specifically, the present invention relates to a graphite material which is suitable as an electrode material for a non-aqueous electrolytic solution secondary battery and a method for producing the same; a carbon material for a battery electrode; and a secondary battery excellent in charge/discharge cycle characteristics and large current load characteristics.

BACKGROUND ART

As a power source of a mobile device, or the like, a lithium ion secondary battery is mainly used. The function of the mobile device or the like is diversified, resulting in increasing in power consumption thereof. Therefore, a lithium ion secondary battery is required to have an increased battery capacity and, simultaneously, to have an enhanced charge/discharge cycle characteristic. Further, there is an increasing demand for a secondary battery with a high output and a large capacity for electric tools such as an electric drill and a hybrid automobile. In this field, conventionally, a lead secondary battery, a nickel-cadmium secondary battery, and a nickel-hydrogen secondary battery are mainly used. A small and light lithium ion secondary battery with high energy density is highly expected, and there is a demand for a lithium ion secondary battery excellent in large current load characteristics.

In particular, in applications for automobiles, such as battery electric vehicles (BEV) and hybrid electric vehicles (HEV), a long-term cycle characteristic over 10 years and a large current load characteristic for driving a high-power motor are mainly required, and a high volume energy density is also required for extending a driving range (distance), which are severe as compared to mobile applications.

In the lithium ion secondary battery, generally, a lithium salt, such as lithium cobaltate, is used as a positive electrode active material, and a carbonaceous material, such as graphite, is used as a negative electrode active material.

Graphite is classified into natural graphite and artificial graphite.

Among those, natural graphite is available at a low cost. However, as natural graphite has a scale shape, if natural graphite is formed into a paste together with a binder and applied to a collector, natural graphite is aligned in one direction. When an electrode made of such a material is charged, the electrode expands only in one direction, which degrades the performance of the electrode. Natural graphite, which has been granulated and formed into a spherical shape, is proposed, however, the resulting spherical natural graphite is aligned because of being crushed by pressing in the course of electrode production. Further, the surface of the natural graphite is active, and hence a large amount of gas is generated during initial charging, which decreases an initial efficiency and degrades a cycle characteristic. In order to solve those problems, Japanese Patent publication No. 3534391 (U.S. Pat. No. 6,632,569, Patent Document 1), etc. propose a method involving coating artificial carbon on the surface of the natural graphite processed into a spherical shape.

With respect to artificial graphite, negative electrode materials using so-called hard carbon and amorphous carbon described in JP 07-320740 A (U.S. Pat. No. 5,587,255, Patent Document 2) are excellent in a characteristic with respect to a large current and also have a relatively satisfactory cycle characteristics.

Artificial graphite typified by a graphitized article of oil, coal pitch, coke and the like is available at a relatively low cost. Particularly, with respect to the artificial graphite made of non-needle-shaped coke, it is possible to make it have a relatively high energy density per volume by performing heat treatment at a high temperature to obtain a negative electrode material which satisfies cycle characteristics and high rate characteristics required for a large battery. It is assumed that these materials can deliver high performance due to a moderate disorder in crystals because the materials have a crystallinity not so high as natural graphite but higher than hard carbon and amorphous carbonaceous materials.

PRIOR ART DOCUMENT

Patent Document

[Patent Document 1] JP 3534391 B2 (U.S. Pat. No. 6,632,569)

[Patent Document 2] JP 07-320740 A (U.S. Pat. No. 5,587,255)

DISCLOSURE OF THE INVENTION

Problems to be Solved by the Invention

The material produced by the method described in Patent Document 1 can address a high-capacity, a low-current, and an intermediate-cycle characteristic required by the mobile applications, etc. However, it is very difficult for the material to satisfy the requests such as a large current and an ultralong-term cycle characteristic of a large battery as described above.

Regarding the negative electrode material described in Patent Document 2, the volume energy density is too low and the price thereof is very expensive, and thus, such negative electrode materials are only used for some special large batteries.

In the case of the artificial graphite made of oil, coal pitch and coke, it is necessary to increase the crystallinity as much as possible by performing the heat treatment at 3,000° C. or higher. Without the heat treatment, it is not possible to achieve a satisfactory energy density per volume. Industrially, these materials are subjected to heat treatment at 3,000° C. or higher in an Acheson furnace for graphitization provided with artificial graphite electrodes, graphite heating furnace and the like. However, when the heat treatment is performed in these furnaces, generally, it causes a serious side reaction at the first charge when the material is made into a battery, which results in lowering the ratio of the amount of the first discharge to that of the first charge: i.e. initial efficiency.

An object of the present invention is to provide a graphite material which is suitable for a carbon material for negative electrodes in lithium ion secondary batteries and the like, which enables the production of electrodes that have a high initial efficiency, while maintaining ultra-long cycle characteristics, large current load characteristics and an energy density required for large batteries at high levels.

Means to Solve the Problems

The present invention relates to a graphite material, a carbon material for battery electrodes, a paste for electrodes, a battery and a lithium ion secondary battery and the method for producing the graphite material as described below.

[1] A graphite material, wherein the oxygen amount (a) (mass %) in the region from the particle surface to 40 nm in the depth is within the range of 0.010≤(a)≤0.04 as determined by the peak intensity of $O_{1s}$ obtained by HAX-PES measurement using a hard X-ray of 7,940 eV.

[2] The graphite material as described in [1] above, wherein an average interplanar spacing $d_{002}$ of the crystallite is 0.3356 nm to 0.3375 nm and the thickness of the crystal in the C-axis direction (Lc) is from 50 to 100 nm measured by the powder X-ray diffraction method according to Japan Society for the Promotion of Science.

[3] The graphite material as described in [1] or [2] above, wherein the average aspect ratio of the primary particles of the graphite material is 1 to 4.

[4] The graphite material as described in any one of [1] to [3] above, wherein an average volumetric-basis particle diameter (D50) is 3 to 20 μm measured by the laser diffraction method and the specific surface area by the BET method is 0.5 to 4 m²/g.

[5] The graphite material as described in any one of [1] to [4] above, wherein the loose bulk density is 0.7 g/cm³ or more and the powder density after the tapping is performed 400 times is 0.8 to 1.6 g/cm³ or less.

[6] A carbon material for battery electrodes comprising the graphite material described in any one of [1] to [5] above.

[7] A paste for electrodes comprising the carbon material for battery electrodes described in [6] above and a binder.

[8] A battery comprising a molded body of the paste for electrodes described in [7] above as a constituent.

[9] A lithium ion secondary battery comprising a molded body of the paste for electrodes described in [7] above as a constituent.

[10] A method for producing the graphite material described in any one of [1] to [5] above, comprising pulverizing a carbon material having a maximum thermal history of 500 to 1,800° C. and subjecting the pulverized product 1 to graphitization treatment at 2,000 to 3,300° C., wherein the graphitization treatment is performed in an Acheson furnace using carbon particles or graphite particles having an average volumetric basis particle diameter (D50) of 2 to 500 μm measured by a laser diffraction method as a filler in which the pulverized product 1 is embedded; and the thickness of the filler powder surrounding the pulverized product 1 is 20 cm or more.

[11] The method for producing the graphite material as described in [10] above, wherein the pulverized product 1 is heated to 2,200 to 3,300° C. by the Joule heat generated by directly passing an electric current through the filler in the Acheson furnace.

[12] The method for producing the graphite material as described in [10] or [11] above, wherein the pulverized product 1 is filled in a graphite crucible and embedded in the filler.

[13] The method for producing the graphite material as described in [10] or [11] above, wherein the pulverized product 1 is embedded in the filler without being filled in a container.

[14] A method for producing the graphite material described in any one of [1] to [5] above, comprising pulverizing a carbon material having a maximum thermal history of 500 to 1,400° C. and subjecting the pulverized product 1 to graphitization treatment at 2,000 to 3,300° C., wherein the graphitization treatment is performed under an inert atmosphere in a graphite heating furnace by filling carbon particles or graphite particles having an average volumetric basis particle diameter (D50) of 2 to 500 μm measured by a laser diffraction method in a graphite crucible as a filler and embedding the pulverized product 1 in the center of the filler.

[15] The method for producing the graphite material as described in any one of [10] to [14] above, wherein the carbon material is obtained by subjecting a crude oil distilled residue, in which a total composition of an Asphaltene component and a resin component is 30 to 80 mass % and a sulfur part is 0.3 to 6 mass %, to delayed-coking with a heating furnace heater output temperature before a coke drum controlled to be 550° C. to 580° C.

[16] The method for producing the graphite material as described in any one of [10] to [15] above, wherein the pulverized product 1 is preheated at a temperature of 500 to 1,800° C. by an indirect heating method before the graphitization treatment.

[17] The method for producing the graphite material as described in any one of [10] to [16] above, wherein the average aspect ratio of the filler particle is 1.20 to 5.00.

Effects of the Invention

Battery electrodes having a high initial efficiency while maintaining a high capacitance, a high energy density and high cycle characteristics can be obtained by using a graphite material obtained by controlling the oxygen concentration in the region from the particle surface to 40 nm in the depth within a specified range as a carbon material for battery electrodes.

The above graphite material is economically-efficient and suited to mass production, and can be produced by a method in which safety is improved.

BRIEF DESCRIPTION OF DRAWINGS

[FIG. 1] The $Au_{4f}$ narrow spectrum of the Au standard sample before performing the energy calibration, which is used for measuring the surface oxygen amount in Examples

MODE FOR CARRYING OUT THE INVENTION

Hereinafter, an embodiment of the present invention is described in details.

(1) Measurement of the Surface Oxygen Concentration

The graphite material in a preferred embodiment of the present invention has the oxygen amount (a) (mass %) in the region from the particle surface to 40 nm in the depth within the range of 0.010≤(a)≤0.04 as determined by the peak intensity of $O_{1s}$ obtained by HAX-PES measurement using a hard X-ray of 7,940 eV.

Conventionally, the surface oxygen concentration of a material was measured by XPS. By a conventional method, the oxygen concentration in a region from the material surface as far as about 1 to 2 nm in the depth can be measured and the measurement in a deeper region was very difficult. However, in a graphite material used as a negative electrode material, the oxygen concentration in a region from the material surface to about 1 to 2 nm in the depth is not substantially correlated with the initial efficiency of batteries mainly depending on the interface reaction, and it was necessary to obtain information in a deeper region of the material. Recently, a high output light source becomes available by SPring-8 (large facility for radiation), permitting the measurement of the oxygen concentration in a deeper region.

By using a graphite material having the oxygen amount (a) (mass %) in the region from the particle surface to 40 nm in the depth within the range of 0.010 to 0.04 mass %, a material having an initial efficiency of 93% or higher while maintaining a high discharge capacity can be stably obtained. Although the reason is not exactly known, a possible reason is that an SEI film can stably grow when a surface structure of a material contains a specified oxygen content, and to the contrary, when the structure contains an excessive oxygen amount, it increases the possibility of a side reaction at the time of forming an SEI film and lowers the initial efficiency. When the oxygen content is too low in a material like natural graphite, it results in the increase in reactivity and lowers the initial efficiency because the edge portion of graphite which is fresh and highly active is exposed on a large surface area. The upper limit of the preferred oxygen amount (a) is 0.040 mass %, and more preferably 0.030 mass %.

It is considered that the surface oxygen concentration of artificial graphite depends on the treatment conditions in the graphitization process, which is the last process of the production.

A specific method for measuring the oxygen content (a) is as described in Examples.

(2) Crystallinity

In the graphite material in a preferred embodiment of the present invention, an average interplanar spacing $d_{002}$ of plane (002) by the X-ray diffraction method is preferably 0.3356 nm to 0.3375 nm and more preferably 0.3356 to 0.3360 nm. Further, a thickness Lc of the crystal in a C-axis direction is preferably 30 to 1,000 nm, more preferably 50 to 200 nm, particularly preferably 80 to 100 nm. $d_{002}$ and $L_c$ can be measured using a powder X-ray diffraction (XRD) method by a known method (see I. Noda and M. Inagaki, Japan Society for the Promotion of Science, 117th Committee material, 117-71-A-1 (1963), M. Inagaki et al., Japan Society for the Promotion of Science, 117th committee material, 117-121-C-5 (1972), M. Inagaki, "carbon", 1963, No. 36, pages 25-34).

The average interplanar spacing $d_{002}$ being in a range of 0.3356 nm to 0.3375 nm makes graphite to have high crystallinity as a whole; and Lc in the above-mentioned range increases the size of the crystallite in the thickness direction, both of which increase a space in which lithium ions can be intercalated.

(3) Aspect Ratio

In a preferred embodiment of the present invention, an average aspect ratio: i.e. maximum length $D_{max}$/maximum length vertical length $DN_{max}$ ($D_{max}$: maximum length at two points on a contour of a particle image, $DN_{max}$: distance between two lines parallel to the line defined by $D_{max}$ and sandwiching a primary particle) of the primary particles of the graphite material is preferably 1 to 4, more preferably 1 to 2, still more preferably 1.00 to 1.32 and most preferably 1.00 to 1.20. By setting the aspect ratio of the particles to be small, a high-density electrode satisfying the energy density required for a large battery can be produced. The aspect ratio of the particles can be measured by the method described in Examples.

(4) Particle Size

In a preferred embodiment of the present invention, the average particle diameter (D50) in the graphite material is preferably 3 to 20 μm in a particle diameter distribution based on a volume measured by a laser diffraction method. D50 is more preferably 5 to 18 μm. As a laser diffraction type measurement device of the particle size distribution, Mastersizer produced by Malvern Instruments Ltd. or the like can be used.

Further, it is preferred that the graphite material in a preferred embodiment of the present invention does not substantially contain particles with a particle diameter of 0.5 μm or less. The particles with a particle diameter of 0.5 μm or less have a large active point on the surface, which decreases an initial efficiency of the battery. Here, the expression that "the graphite material does not substantially contain particles with a particle diameter of 0.5 μm or less" means that the content of the particles with a particle diameter of 0.5 μm or less is 0.1 mass % or less. The content of the particles with a particle diameter of 0.5 μm or less can be measured by the laser diffraction type measurement device of the particle size distribution.

Further, the particle size of the filler powder was measured by the same method as described above.

(5) Specific Surface Area

In a preferred embodiment of the present invention, the BET specific surface area of the graphite material is preferably 0.5 to 4 $m^2/g$, more preferably 0.6 to 2 $m^2/g$ and still more preferably 0.8 to 1.8 $m^2/g$. If the specific surface area is too large, it increases the surface activity of the graphite powder and tends to lower the initial efficiency due to the decomposition and the like of the electrolytic solution. Further, it requires a greater amount of a binder when the powder is molded into an electrode and therefore increases the binder coverage of the graphite particles, which is not desirable because it tends to lower the discharge capacity of the battery.

(6) Bulk Density

It is preferred that the loose bulk density (0 tapping) of the graphite material in a preferred embodiment of the present invention be 0.7 $g/cm^3$ or more, and the powder density (tap density) when tapping is performed 400 times be 0.8 to 1.6 $g/cm^3$. The powder density is more preferably 0.9 to 1.6 $g/cm^3$, most preferably 1.1 to 1.6 $g/cm^3$.

The loose bulk density is obtained by dropping 100 g of the sample to a graduated cylinder from a height of 20 cm, and measuring the volume and mass without applying a vibration. The tap density is obtained by measuring the volume and mass of 100 g of powder tapped 400 times using an Autotap produced by Quantachrome Instruments.

These methods are based on ASTM B527 and JIS K5101-12-2, and the fall height of the Autotap in the tap density measurement is 5 mm.

By setting the loose bulk density to be 0.7 $g/cm^3$ or more, the electrode density before pressing at a time of application to an electrode can be enhanced further. Based on this value, it can be predicted whether or not a sufficient electrode density can be obtained by one roll pressing. Further, if the tap density is within the above-mentioned range, the electrode density achieved during pressing can be enhanced sufficiently.

(7) Method of Producing the Graphite Material

The graphite material in a preferred embodiment of the present invention can be produced by subjecting a carbon material to heat treatment at 2,000 to 3,300° C.

It is preferable to select the carbon material from the carbon material such as petroleum-based pitch, coal-based pitch, petroleum-based coke, coal-based coke and a mixture thereof; and the maximum thermal history of the material is preferably 500 to 1,800° C. Among these, preferred is petroleum-based coke; and a residue obtained by distilling crude oil under a normal atmospheric pressure or a reduced pressure in an oil refining process, pyrolytic tar, etc. which are subjected to coking can be used. An example of such a carbon material include the material obtained by subjecting a distillation residue of crude oil, in which the total of the compositions of the Asphaltene component and the resin component be 30 to 80 mass % and the sulfur component be 0.3 to 6 mass % to a delayed coking process, wherein a heating furnace heater output temperature before a coke drum is regulated to be 550 to 580° C. The material is the one described in claim 15 of Japanese Patent No. 4738553 (US Patent Publication No. 2012/0045642) and the details are described in paragraphs [0039] to [0044] of the specification.

It is preferred that, when the obtained carbon material is heated from 300° C. to 1,200° C. in an inactive atmosphere, weight reduction on heating (for example, a volatile component of hydrocarbon involved in carbonization) is 5 to 20 mass %.

The carbon material whose weight reduction on heating is less than 5% by mass tends to form plate-shaped particles after crushing. Further, a crushed surface (edge portion) is exposed, and a specific area increases, which also increases side reaction. On the contrary, in the carbon material whose weight reduction on heating exceeds 20% by mass, particles adhere to each other in a large amount after graphitization, which influences a yield.

The carbon material is crushed before graphitization. For crushing the carbon material, known jet milling, hammer milling, roller milling, pin milling, vibration milling, or the like is used. It is preferred that the carbon material be crushed in a state in which a thermal hysteresis is as low as possible. When a thermal hysteresis is lower, the carbon material has a low hardness and is easily crushed, and since the cracks during crushing have almost random directions, it tends to have a smaller aspect ratio. Further, a probability with which an edge portion exposed in the crushed surface is recovered in a later heating process increases, and this has an effect of reducing side reaction during charging/discharging.

It is preferred that the crushed carbon material be classified so that an average particle diameter (D50) based on a volume measured by the laser diffraction method is 3 to 20 μm. When D50 is large, the electrode density is less likely to increase. In contrast, when D50 is small, side reaction tends to occur during charging/discharging. It should be noted that D50 can be measured by a laser diffraction type particle size distribution measuring device such as Mastersizer (produced by Malvern Instruments Ltd.).

The average aspect ratio of the crushed carbon material is preferably 1 to 4, more preferably 1 to 2, still more preferably 1.00 to 1.32 and most preferably 1.00 to 1.20. The aspect ratio can be measured by the method described in Examples.

The crushed carbon material may be sintered at a low temperature of about 500 to 1,800° C. in a non-oxidative atmosphere before graphitization. A preferred temperature is from 800 to 1,500° C. The low-temperature sintering can reduce the generation of gas in the subsequent graphitization and can also lower the bulk density, which can reduce a cost for graphitization.

Also, the carbon material may be preheated at 800 to 1,500° C. before crushing instead of being sintered at a low temperature after crushing.

(8) Graphitization Treatment

The graphitization treatment can be performed in an Acheson furnace and a furnace using a graphite heater.

The industrial graphitization treatment in the production of artificial graphite is commonly performed in an Acheson furnace used for the production of artificial graphite electrodes. In an Acheson furnace, the graphitization treatment is performed by filling a cuboid container with coke grains so-called "filler", embedding an object to be heated in the coke grains; allowing an electric current to pass through the filler; and indirectly heating the object to be heated by the Joule heat generated from the filler to obtain a temperature of about 3,000° C. In this case, since the filler which generated heat is attacked by oxygen first, the object to be heated in the filler can be protected from the attack by the oxygen in air to a certain degree.

However, the size of the coke grain as a filler is generally from several millimeters to several centimeters. As the oxygen attack extends to the object to be heated under this general condition, it was very difficult to control the oxygen amount (a) (mass %) in the region from the particle surface to 40 nm in the depth is within the range of 0.010≤(a)≤0.04. To solve the problem, the filler powder is to be miniaturized in order to block the oxygen entry in an embodiment of the present invention. In that case, an average particle diameter (D50) based on a volume measured by a laser diffraction method of the filler is 500 μm or less, preferably 100 μm or less, more preferably 50 μm or less and most preferably 30 μm or less. However, if the filler is downsized without limit, it is ready to scatter and becomes very difficult to handle. Therefore, D50 is preferably 2 μm or more.

Also, when D50 is 1 μm or less, the gas component generated during the heating becomes difficult to be released and there is a danger of explosion.

The aspect ratio of the filler particles is preferably 5 or less, more preferably 4 or less and still more preferably 3 or less. By setting the aspect ratio to 5 or less, the flowability of the filler becomes higher at the time of gas generation, which suppresses a rapid generation of gas and allows fine gas bubbles to be generated frequently. The aspect ratio is preferably 1.2 or more. The aspect ratio of less than 1.2 makes the flow of the filler particles too rapid, and the powder may blow out during the heating.

The thickness of the filler powder in which the object to be heated is embedded is preferably 20 cm or more, more preferably 25 cm or more and most preferably 30 cm or more. There is no problem in further increasing the thickness but if the filler is too thick, it decreases the amount of the powder which can be treated with heat relative to the size of the furnace and decreases the production efficiency.

Here, the term "thickness" includes not only the distance from the top surface of the filler to the top end of the object to be heated in the Acheson furnace but also the distance from the side walls or bottom surface of the Acheson furnace to the object to be heated. Since the wall material of the Acheson furnace allows air to pass in some degree (i.e. not capable of hermetic sealing), the oxygen passes through the furnace. That is, it is preferable to embed an object to be heated in a region from the top surface of the filler to 20 cm or more in the depth and also apart from the side walls and bottom surface of the Acheson furnace with a distance of 20 cm or more.

When the thickness is less than 20 cm, the object to be heated becomes more likely to be oxidized at the time of graphitization treatment.

There is no particular limitation on the physical properties of the filler as long as the filler has conductivity sufficient to allow current to pass through in the Acheson furnace.

It is general to enclose the object to be heated in a covered container. There is no particular limitation on a container which can be used in a preferred embodiment of the present invention, as long as that the container is made of a material that will withstand the heat treatment at about 3,000° C. and the material does not cause a severe reaction with the object to be heated. Examples of such a container include a graphite crucible. When the contamination of the object to be heated from the filler is insignificant, the object may be subjected to heat treatment without using a container. In this case, a graphitized object to be heated can be obtained by identifying the area and the depth where the object to be heated is embedded and collecting the powder in the area after the graphitization is completed.

Also, if condition permits, graphitized particles having a desired surface oxygen concentration can be obtained by filling the whole furnace with the object to be heated and collecting the powder in the area after passing an electric current and performing graphitization. In this case, the object to be heated serves as a filler as well.

In the case when the graphitization treatment is performed in a furnace using a graphite heater, it is also necessary to heat an object while controlling the oxygen content. In a graphite heater furnace, argon gas having a purity of 99.99% or more is generally used as an inert gas. This enables the suppression of the oxidative consumption of the graphite heater and reduction of the oxidation of the graphite powder which is the object to be heated as well. However, even if the heat treatment is actually performed under such conditions, it is difficult to make the oxygen content (a) be 0.04 mass % or lower. The reason for this is considered to be that although the high purity argon as a replacement gas contains little oxygen, the oxygen amount is accumulated due to the continuous gas flow, thereby oxidizing the surface of the carbon particles.

The oxygen amount in the case of using a graphite heater can be controlled by, for example, using graphite crucibles doubly. That is, the method comprises filling graphite crucible A with an object to be heated; putting graphite crucible A in graphite crucible B which is bigger than graphite crucible A; filling the space between graphite crucibles A and B with the same filler as in the Acheson furnace and closing the lid of the crucible; and placing the crucible in a graphite heater furnace to be heated under argon atmosphere. The filler reduces the impact by oxygen as before. Accordingly, the distance of the space between graphite crucible A and graphite crucible B (i.e. the thickness of the filler which was filled in the space) is critical. When the distance is too short, the oxygen concentration on the surface of the object to be heated will go beyond 0.04 mass % as the upper limit of the defined range. When the distance is too long, the oxygen concentration falls below the lower limit of 0.01 mass %. Thus, the regulation of the oxygen concentration is required. Although the distance cannot be flatly defined because it depends on the size of the graphite heater, the size of the filler, the oxygen amount in a gas, and the like; the distance is generally about 1 to 20 cm.

The lower limit of the graphitization temperature is generally 2,000° C., preferably 2,500° C., more preferably 2,900° C., most preferably 3,000° C. Although the upper limit of the graphitization is not particularly limited, the upper limit is preferably 3,300° C. because a high discharge capacity is obtained easily.

After the graphitization, it is preferred that the graphite material be not shredded or crushed. If the graphite material is shredded or crushed after the graphitization, there is a possibility that the smoothened surface may be damaged, which degrades the performance.

(9) Composite Material/Mixed Material

The graphite material in a preferred embodiment of the present invention can be used under the condition of being coated with another carbon material.

For example, the surface of graphite particles forming the graphite material can be coated with optically isotropic carbon. The coating can improve an input characteristic during charging, which enhances the characteristics required for a large battery. Although the coating amount is not particularly limited, the amount of the coating material is preferably 0.1 to 10 mass % based on the core material.

As the coating method, a known technology can be used, which is not particularly limited. For example, the coating can be carried out by a method of performing coating of graphite particles by a mechanochemical method with Mechanofusion produced by Hosokawa Micron Corporation, using a coal-tar pitch of a diameter of 0.1 to 1 μm and a graphite material, and heating the graphite particles at 800° C. to 3,300° C. in a non-oxidative atmosphere to form optically isotropic carbon on the surface; and a method of allowing a composition containing a polymer to adhere to at least a partial surface of graphite particles and heat-treating the graphite particles at 800° C. to 3,300° C. in a non-oxidative atmosphere to form optically isotropic carbon on the surface. As the composition containing a polymer, for example, a composition containing dry oil or aliphatic acid thereof and a phenol resin may be used. The latter method is described in, for example, JP 2003-100293 A (International publication WO 03/028128) and JP 2005-019397 A (International publication WO 2004/109825).

Further, part of carbon fiber in a preferred embodiment of the present invention can adhere to the surface of the graphite particles. By allowing the carbon fiber to adhere to the surface of the graphite particles, the carbon fiber in an electrode is easily dispersed, and the cycle characteristic and the current load characteristic are further enhanced due to the synergetic effect of the carbon fiber in combination with the characteristics of the graphite particles serving as the core material. Although the adhesion amount of the carbon fiber is not particularly limited, the adhesion amount is preferably 0.1 to 5 mass % in terms of the graphite material serving as a core.

As the adhesion method, a known method may be used, which is not particularly limited. For example, using a coal-tar pitch with a diameter of 0.1 to 1 μm, a graphite material and carbon fiber, carbon fiber is allowed to adhere to the graphite particles during the coating of the graphite particles by a mechanochemical method with a Mechanofusion produced by Hosokawa Micron Corporation, followed by heating at 800° C. to 3,300° C. in a non-oxidative atmosphere. Further, a composition containing a polymer is allowed to adhere to at least a partial surface of the graphite particles, fibrous carbon is mixed with the graphite particles, the fibrous carbon is allowed to adhere to the graphite particles via the composition containing a polymer, and then the graphite particles are heat-treated at 800° C. to 3,300° C. in a non-oxidative atmosphere, thereby carrying out the coating. As the composition containing a polymer, for example, a composition containing dry oil or aliphatic acid thereof and a phenol resin can be used. The latter method is described in, for example, JP 2003-100293 A (International publication WO 03/028128) and JP 2005-019397 A (International publication WO 2004/109825).

Examples of the carbon fiber include: organic carbon fiber such as PAN-based carbon fiber, pitch-based carbon fiber, and rayon-based carbon fiber; and vapor-grown carbon fiber. Of those, particularly preferred is vapor-grown carbon fiber having high crystallinity and high heat conductivity. In the case of allowing the carbon fiber to adhere to the surfaces of the graphite particles, particularly preferred is vapor-grown carbon fiber.

Vapor-grown carbon fiber is, for example, produced by: using an organic compound as a material; introducing an organic transition metal compound as a catalyst into a high-temperature reaction furnace with a carrier gas to form fiber;

and then conducting heat treatment (see, for example, JP 60-54998 A (U.S. Pat. No. 4,572,813) and JP 2778434 B2). The vapor-grown carbon fiber has a fiber diameter of 2 to 1,000 nm, preferably 10 to 500 nm, and has an aspect ratio of preferably 10 to 15,000.

Examples of the organic compound serving as a raw material for carbon fiber include a gas such as toluene, benzene, naphthalene, ethylene, acetylene, ethane, natural gas, carbon monoxide, and a mixture thereof. Of those, an aromatic hydrocarbon such as toluene or benzene is preferred.

The organic transition metal compound includes a transition metal serving as a catalyst. Examples of the transition metal include metals of Groups IVa, Va, VIa, VIIa, and VIII of the periodic table. Preferred examples of the organic transition metal compound include compounds such as ferrocene and nickelocene.

The carbon fiber may be obtained by crushing or untangling long fiber obtained by vapor deposition or the like. Further, the carbon fiber may be coagulated on a flock.

Carbon fiber which has no pyrolyzate derived from an organic compound or the like adhering to the surface thereof or carbon fiber which has a carbon structure with high crystallinity is preferred.

The carbon fiber with no pyrolyzate adhering thereto or the carbon fiber having a carbon structure with high crystallinity can be obtained, for example, by sintering (heat-treating) carbon fiber, preferably, vapor-grown carbon fiber in an inactive gas atmosphere. Specifically, the carbon fiber with no pyrolyzate adhering thereto is obtained by heat treatment in inactive gas such as argon at about 800° C. to 1,500° C. Further, the carbon fiber having a carbon structure with high crystallinity is obtained by heat treatment in inactive gas such as argon preferably at 2,000° C. or more, more preferably 2,000° C. to 3,000° C.

It is preferred that the carbon fiber contains branched fiber. Further, a portion having a hollow structure in which the fiber as a whole communicates with each other may be present. For this reason, carbon layers forming a cylindrical portion of the fiber are formed continuously. The hollow structure refers to a structure in which a carbon layer is wound in a cylindrical shape and includes an incomplete cylindrical structure, a structure having a partially cut part, two stacked carbon layers connected into one layer, and the like. Further, the cross-section is not limited to a complete circular cross-section, and the cross-section of the cylinder includes an oval cross-section or a polygonal cross-section.

Further, the average interplanar spacing $d_{002}$ of a (002) plane by the X-ray diffraction method of the carbon fiber is preferably 0.344 nm or less, more preferably 0.339 nm or less, particularly preferably 0.338 nm or less. Further, it is preferred that a thickness ($L_c$) in a C-axis direction of crystal be 40 nm or less.

(10) Carbon Material for Battery Electrodes

The carbon material for battery electrodes in a preferred embodiment of the present invention contains the above-mentioned graphite composite material. When the above-mentioned graphite composite material is used as a carbon material for a battery electrode, a battery electrode having a high initial efficiency while maintaining a high capacitance, a high energy density and high cycle characteristics can be obtained.

The carbon material for a battery electrode may be used as, for example, a negative electrode active material and an agent for imparting conductivity to a negative electrode of a lithium ion secondary battery.

While the carbon material for battery electrodes in a preferred embodiment of the present invention may comprise the above-mentioned graphite material only, the materials obtained by blending spherical natural or artificial graphite having $d_{002}$ of 0.3370 nm or less in an amount of 0.01 to 200 parts by mass and preferably 0.01 to 100 parts by mass; or natural or artificial graphite having $d_{002}$ of 0.3370 nm or less and aspect ratio of 2 to 100 in an amount of 0.01 to 120 parts by mass and preferably 0.01 to 100 parts by mass based on 100 parts by mass of the graphite material. By using the graphite material mixed with other graphite materials, the graphite material can be added with excellent characteristics of the other graphite materials while maintaining the excellent characteristics of the graphite material in a preferred embodiment of the present invention. Specifically, when mesocarbon microbeads (MCMB) is added as the spherical artificial graphite, the density of the electrode produced from the material increases due to the high fragility of MCMB, and the volume energy density can be increased. With respect to mixing of these materials, the blending amount can be determined by appropriately selecting the materials to be mixed depending on the required battery characteristics.

Carbon fiber may also be mixed with the carbon material for battery electrodes. Carbon fiber similar to the carbon fiber described above may be used. The mixing amount is 0.01 to 20 parts by mass, preferably 0.5 to 5 parts by mass in terms of total 100 parts by mass of the above-mentioned graphite material.

(11) Paste for Electrodes

The paste for an electrode in a preferred embodiment of the present invention contains the above-mentioned carbon material for a battery electrode and a binder. The paste for an electrode can be obtained by kneading the carbon material for a battery electrode with a binder. A known device such as a ribbon mixer, a screw-type kneader, a Spartan Granulator, a Loedige Mixer, a planetary mixer, or a universal mixer may be used for kneading. The paste for an electrode may be formed into a sheet shape, a pellet shape, or the like.

Examples of the binder to be used for the paste for an electrode include known binders such as: fluorine-based polymers such as polyvinylidene fluoride and polytetrafluoroethylene; and rubber-based binders such as styrene-butadiene rubber (SBR).

The appropriate use amount of the binder is 1 to 30 parts by mass in terms of 100 parts by mass of the carbon material for a battery electrode, and in particular, the use amount is preferably about 3 to 20 parts by mass.

A solvent can be used at a time of kneading. Examples of the solvent include known solvents suitable for the respective binders such as: toluene and N-methylpyrolidone in the case of a fluorine-based polymer; water in the case of SBR; dimethylformamide; and isopropanol. In the case of the binder using water as a solvent, it is preferred to use a thickener together. The amount of the solvent is adjusted so as to obtain a viscosity at which a paste can be applied to a collector easily.

(12) Electrode

An electrode in a preferred embodiment of the present invention is formed of a molding of the above-mentioned paste for an electrode. The electrode is obtained, for example, by applying the paste for an electrode to a collector, followed by drying and pressure molding.

Examples of the collector include foils and mesh of aluminum, nickel, copper, stainless steel and the like. The coating thickness of the paste is generally 50 to 200 μm. When the coating thickness becomes too large, a negative electrode may not be placed in a standardized battery container. There is no particular limitation to the paste coating method, and an example of the coating method includes a method involving coating with a doctor blade or a bar coater, followed by molding with roll pressing or the like.

Examples of the pressure molding include roll pressure molding, compression molding, and the like. The pressure for the pressure molding is preferably about 1 to 3 t/cm$^2$. As the electrode density of the electrode increases, the battery capacity per volume generally increases. However, if the electrode density is increased too much, the cycle characteristic is generally degraded. If the paste for an electrode in a preferred embodiment of the present invention is used, the degradation in the cycle characteristic is small even when the electrode density is increased. Therefore, an electrode having the high electrode density can be obtained. The maximum value of the electrode density of the electrode obtained using the paste for an electrode is generally 1.7 to 1.9 g/cm$^3$. The electrode thus obtained is suitable for a negative electrode of a battery, in particular, a negative electrode of a secondary battery.

(13) Battery, Secondary Battery

A battery or a secondary battery can be produced, using the electrode as a constituent element (preferably, as a negative electrode).

The battery or secondary battery in a preferred embodiment of the present invention is described by taking a lithium ion secondary battery as a specific example. The lithium ion secondary battery has a structure in which a positive electrode and a negative electrode are soaked in an electrolytic solution or an electrolyte. As the negative electrode, the electrode in a preferred embodiment of the present invention is used.

In the positive electrode of the lithium ion secondary battery, a transition metal oxide containing lithium is generally used as a positive electrode active material, and preferably, an oxide mainly containing lithium and at least one kind of transition metal element selected from the group consisting of Ti, V, Cr, Mn, Fe, Co, Ni, Mo, and W, which is a compound having a molar ratio of lithium to a transition metal element of 0.3 to 2.2, is used. More preferably, an oxide mainly containing lithium and at least one kind of transition metal element selected from the group consisting of V, Cr, Mn, Fe, Co, and Ni, which is a compound having a molar ratio of lithium to a transition metal of 0.3 to 2.2, is used. It should be noted that Al, Ga, In, Ge, Sn, Pb, Sb, Bi, Si, P, B, and the like may be contained in a range of less than 30% by mole with respect to the mainly present transition metal. Of the above-mentioned positive electrode active materials, it is preferred that at least one kind of material having a spinel structure represented by a general formula $Li_xMO_2$ (M represents at least one kind of Co, Ni, Fe, and Mn, and $0<x\leq1.2$), or $Li_yN_2O_4$ (N contains at least Mn, and $0<y\leq2$) be used.

Further, as the positive electrode active material, there may be particularly preferably used at least one kind of materials each including $Li_yM_aD_{1-a}O_2$ (M represents at least one kind of Co, Ni, Fe, and Mn, D represents at least one kind of Co, Ni, Fe, Mn, Al, Zn, Cu, Mo, Ag, W, Ga, In, Sn, Pb, Sb, Sr, B, and P with the proviso that the element corresponding to M being excluded, y=0 to 1.2, and a=0.5 to 1) and materials each having a spinel structure represented by $Li_z(N_bE_{1-b})_2O_4$ (N represents Mn, E represents at least one kind of Co, Ni, Fe, Mn, Al, Zn, Cu, Mo, Ag, W, Ga, In, Sn, Pb, Sb, Sr, B and P, b=1 to 0.2, and z=0 to 2).

Specifically, there are exemplified $Li_xCoO_2$, $Li_xNiO_2$, $Li_xMnO_2$, $Li_xCo_aNi_{1-a}O_2$, $Li_xCo_bV_{1-b}Oz$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, and $Li_xMn_cFe_{2-c}O_4$ (where, x=0.02 to 1.2, a=0.1 to 0.9, b=0.8 to 0.98, c=1.6 to 1.96, and z=2.01 to 2.3). As the most preferred transition metal oxide containing lithium, there are given $Li_xCoO_2$, $Li_xNiO_2$, $Li_xMnO_2$, $Li_xCo_aNi_{1-a}O_2$, $Li_xMn_2O_4$, and $Li_xCo_bV_{1-b}O_z$ (x=0.02 to 1.2, a=0.1 to 0.9, b=0.9 to 0.98, and z=2.01 to 2.3). It should be noted that the value of x is a value before starting charge and discharge, and the value increases and decreases in accordance with charge and discharge.

Although the average particle size of the positive electrode active material is not particularly limited, the size is preferably 0.1 to 50 μm as a value of the average particle size diameter (D50) based on a volume measured by the laser diffraction method. It is preferred that the volume of the particles of 0.5 to 30 μm be 95% or more. It is more preferred that the volume occupied by the particle group with a particle diameter of 3 μm or less be 18% or less of the total volume, and the volume occupied by the particle group of 15 μm or more and 25 μm or less be 18% or less of the total volume. These values may be measured by a laser diffraction type measurement device of particle size distribution such as Mastersizer produced by Malvern Instruments Ltd.

Although the specific area is not particularly limited, the area is preferably 0.01 to 50 m$^2$/g, particularly preferably 0.2 m$^2$/g to 1 m$^2$/g by a BET method. Further, it is preferred that the pH of a supernatant obtained when 5 g of the positive electrode active material is dissolved in 100 ml of distilled water be 7 or more and 12 or less.

In a lithium ion secondary battery, a separator may be provided between a positive electrode and a negative electrode. Examples of the separator include non-woven fabric, cloth, and a microporous film each mainly containing polyolefin such as polyethylene and polypropylene, a combination thereof, and the like.

As an electrolytic solution and an electrolyte forming the lithium ion secondary battery in a preferred embodiment of the present invention, a known organic electrolytic solution, inorganic solid electrolyte, and polymer solid electrolyte may be used, but an organic electrolytic solution is preferred in terms of electric conductivity.

As a solvent of the organic electrolytic solution, preferred is a solvent such as: an ether such as diethyl ether, dibutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol dimethyl ether, or ethylene glycol phenyl ether; an amide such as formamide, N-methylformamide, N,N-dimethylformamide, N-ethylformamide, N,N-diethylformamide, N-methylacetamide, N,N-dimethylacetamide, N-ethylacetamide, N,N-diethylacetamide, N,N-dimethylpropionamide, or hexamethylphosphorylamide; a sulfur-containing compound such as dimethylsulfoxide or sulfolane; a dialkyl ketone such as methyl ethyl ketone or methyl isobutyl ketone; a cyclic ether such as ethylene oxide, propylene oxide, tetrahydrofuran, 2-methoxytetrahydrofuran, or 1,3-dioxolan; a carbonate such as ethylene carbonate or propylene carbonate; γ-butyrolactone; N-methylpyrrolidone; acetonitrile; nitromethane, 1,2-dimethoxyethane; or the like. Further, there are preferably exemplified: esters such as ethylene carbonate, butylene carbonate, diethyl carbonate, dimethyl carbonate, propylene carbonate, vinylene carbonate, and y-butyrolactone; ethers such as dioxolan, diethyl ether, and diethoxyethane; dimethylsulfoxide; acetonitrile; tetrahydrofuran; and the like. A carbonate-based nonaqueous solvent such as ethylene carbonate or propylene carbonate may be particularly preferably used. One kind of those solvents may be used alone, or two or more kinds thereof may be used as a mixture.

A lithium salt is used for a solute (electrolyte) of each of those solvents. Examples of a generally known lithium salt include $LiClO_4$, $LiBF_4$, $LiPF_6$, $LiAlCl_4$, $LiSbF_6$, $LiSCN$, $LiCl$, $LiCF_3SO_3$, $LiCF_3CO_2$, $LiN(CF_3SO_2)_2$, and the like.

Examples of the polymer solid electrolyte include a polyethylene oxide derivative and a polymer containing the derivative, a polypropylene oxide derivative and a polymer containing the derivative, a phosphoric acid ester polymer, a polycarbonate derivative and a polymer containing the derivative, and the like.

It should be noted that there is no constraint for the selection of members required for the battery configuration other than the aforementioned members.

EXAMPLES

Hereinafter, the present invention is described in more detail by way of typical examples.

It should be noted that, as for graphite material particle of Examples and Comparative Examples, average interplanar spacing ($d_{002}$) and Lc by an X-ray diffraction method and tap density (bulk density) are measured by the method described in detail in the "Mode for carrying out the Invention" of the specification. Further, the methods for measuring other physical properties are given below.

(1) Measurement of the surface oxygen content

Using a permanent apparatus installed in SPring-8 (Beamline BL46XU), HAX-PES measurement using an X-ray having incident energy of 7,940 eV was performed to thereby determine the oxygen amount on the surface of a graphite material.

As measurement conditions, an energy range of 7,638 to 7,658 eV in kinetic energy of photoelectrons is measured for $C_{1s}$ narrow spectrum and an energy range of 7,396 to 7,416 eV in kinetic energy of photoelectrons is measured for $O_{1s}$ narrow spectrum.

The oxygen amount on the surface of a graphite material is determined according to the method described below.

Energy Calibration of a Photoelectron Spectrum

A plate-like Au sample was measured as a standard sample. An energy range of 7,648 to 7,859 eV in kinetic energy is measured for $Au_{4f}$ narrow spectrum, and the $\Phi$ value being the work function of the permanent apparatus of BL46XU was computed by calculating the difference between the peak position of $Au_{4f7/2}$ obtained by the measurement and the theoretical peak position $Au_{4f7/2}$ (83.9 eV). The energy calibration of the narrow spectrum of the graphite material is carried out based on the calculated $\Phi$ value.

FIG. 1 shows the $Au_{4f}$ narrow spectrum of the Au standard sample before performing the energy calibration. In this case, the binding energy of $Au_{4f7/2}$ is 85.05 eV and therefore the work function $\Phi$ value of the permanent apparatus of BL46XU is calculated to be 1.15 eV.

Normalization of the Photoelectron Spectrum Intensity

The intensity of the $O_{1s}$ narrow spectrum of a graphite material is normalized based on an arbitrary $C_{1s}$ narrow spectrum intensity and the $C_{1s}$ narrow spectrum intensity obtained by measurement. The normalized intensity x ($O_{1s}$) is calculated from the following formula 1.

$$\text{Normalized intensity }(O_{1s}) = \text{measured intensity }(O_{1s}) \times \text{arbitrary intensity }(C_{1s})/\text{measured intensity }(C_{1s}) \quad \text{[Formula 1]}$$

Determination of the Oxygen Quantity on the Surface of a Graphite Material

As mentioned above, based on the normalized intensity ($O_{1s}$) of the graphite material in Examples and Comparative Examples, the oxygen quantity on the surface of the graphite material is determined by the following formula 2. Here, the arbitrary intensity ($C_{1s}$) in formula 2 is the value used in formula 1.

$$\text{Oxygen amount (a) (mol \%) on the surface of a graphite material} = (\text{normalized intensity }(O_{1s})/\text{arbitrary intensity c }(C_{1s})) \times \text{cumulated number of measurement d }(C_{1s})/\text{cumulated number of measurement e }(O_{1s}) \quad \text{[Formula 2]}$$

In this measurement, the information on the region from the surface of a graphite material to about 40 nm in the depth is to be integrated by using a very high-intensity radiation. Hence, a highly accurate measurement results can be obtained, being nearly unaffected by the contamination on the surface of the graphite material.

It is appropriate to calculate the oxygen amount by the above method of normalizing the intensity of $C_{1s}$ narrow spectrum because carbon being a main component accounts for a major portion of the graphite material.

(2) Average Particle Diameter (D50)

The average particle diameter based on a volume (D50) was determined using Mastersizer produced by Malvern Instruments Ltd. as a laser diffraction type measurement device of particle size distribution.

(3) Specific Surface Area

Using a specific area measurement apparatus NOVA-1200 (produced by Yuasa Ionics Inc.), a specific surface area was measured by a BET method that is a general measurement method of a specific surface area.

(4) Aspect Ratio

The aspect ratio of the particles can be measured by image analysis, using FPIA3000 produced by Sysmex Corporation. As for measurement points, at least 3,000 points, preferably 30,000 points or more, more preferably 50,000 points or more are measured and a calculated average value is used.

The aspect ratio of the filler is measured by the same method as described above.

(5) Battery Evaluation Method a) Production of Paste:

To 1 part by mass of a graphite material, 0.1 part by mass of KF polymer L1320 produced by Kureha Corporation (N-methylpyrrolidone (NMP) solution containing 12% by mass of polyvinylidene fluoride (PVDF)) is added, and the mixture is kneaded by a planetary mixer to obtain a main undiluted solution.

b) Production of an Electrode:

NMP was added to the main undiluted solution and the viscosity thereof was adjusted. After that, the resultant solution was applied to a high-purity copper foil to a thickness of 250 μm using a doctor blade. The high-purity copper foil thus obtained was dried in vacuum at 120° C. for 1 hour and punched into a size of 18 mmΦ. The electrode thus punched out was sandwiched between pressing plates made of supersteel and pressed so that a press pressure becomes about $1 \times 10^2$ to $3 \times 10^2$ N/mm² ($1 \times 10^3$ to $3 \times 10^3$ kg/cm²) with respect to the electrode. Then, the electrode was dried in a vacuum drier at 120° C. for 12 hours to obtain an electrode for evaluation.

c) Production of a Battery:

A triode cell was produced as follows. The following operation was performed in a dry argon atmosphere at a dew point of −80° C. or less.

In a cell (inner diameter: about 18 mm) with a screwed-type lid made of polypropylene, the carbon electrode with a copper foil produced in the above-mentioned item (b) and a metal lithium foil were sandwiched and stacked between separators (microporous films made of polypropylene (Cell Guard 2400)). Further, metal lithium for reference was stacked in the same way. An electrolytic solution is added to the resultant to obtain a cell for testing.

d) Electrolytic Solution:

In a mixed solution of 8 parts by mass of ethylene carbonate (EC) and 12 parts by mass of diethyl carbonate (DEC), 1 mol/liter of $LiPF_6$ was dissolved as an electrolyte.

e) Measurement Test of a High-Rate Discharge Capacity Keeping Ratio

A constant-current and constant-voltage discharge test was performed at a current density of 0.2 mA/cm² (corresponding to 0.1 C). The test was performed in a thermostat bath set at 25° C.

Regarding charging (insertion of lithium into carbon), constant current (CC) charging was performed at 0.2 mA/cm² from a rest potential to 0.002 V. Next, the charging was switched to constant voltage (CV) charging at 0.002 V and stopped when a current value dropped to 25.4 μA.

Regarding discharging (discharge from carbon), CC discharging was performed at a predetermined current density and cut off at a voltage of 1.5 V.

Example 1

A residue obtained by distilling Venezuelan crude oil under reduced pressure was used as a material (specific gravity: 3.4° API, Asphaltene component: 21%, resin component: 11%, and sulfur component: 3.3%). This material was injected into a delayed coking process. At this time, the process was performed at a heating furnace heater output temperature of 570° C. before a coke drum. The internal pressure was set to 20 psig. The coke thus obtained was cooled with water and discharged from the coking drum. Subsequently, the coke was heated at 120° C. and dried to a moisture-containing ratio of 0.5% by mass or less to obtain dried coke 1. At this time, the reduced amount in the coke by heating in an argon atmosphere from 300° C. to 1,200° C. was 11.8% by mass. The dried coke was crushed with a bantam mill produced by Hosokawa Micron Corporation. Next, the crushed coke was subjected to air-flow screening with Turboclassifier TC-15N produced by Nisshin Engineering Inc. to obtain a carbon material, wherein D50 was 17.5 μm. The crushed carbon material was placed in a graphite crucible with a screwcap under nitrogen atmosphere.

Next, petroleum-based coke 1 which was crushed so as to have a D50 value of 17.5 μm (aspect ratio of 2.5), and filled as filler 1 in an Acheson furnace for graphitizing artificial graphite electrodes. The graphite crucible was embedded in the filler of the Acheson furnace at depth of 50 cm. The distance from the bottom surface of the Acheson furnace to the bottom surface of the graphite crucible was 50 cm and the shortest distance from the side surface of the Acheson furnace to the side surface of the graphite crucible was 50 cm. By passing an electric current through the furnace and performing heat treatment at 3,100° C., a graphite material was obtained. The sample was measured for various physical properties and made into an electrode as described above and the cycle characteristics and the like of the electrode were measured. Table 1 shows the results.

Example 2

The dried coke 1 used in Example 1 was adjusted by a bantam mill and Turboclassifier so as to have D50 of 17.5 μm. The crushed carbon material was filled in a graphite crucible with a screwed-cap.

Next, petroleum-based coke 1 which was crushed so as to have D50 of 450 μm (aspect ratio of 2.5) was filled as filler 2 in an Acheson furnace for graphitizing artificial graphite electrodes. The graphite crucible was embedded in the filler of the Acheson furnace at depth of 50 cm. The distance from the bottom surface of the Acheson furnace to the bottom surface of the graphite crucible was 50 cm and the shortest distance from the side surface of the Acheson furnace to the side surface of the graphite crucible was 50 cm. By passing an electric current through the furnace and performing heat treatment at 3,100° C., a graphite material was obtained. The sample was measured for various physical properties and made into an electrode as described above and the cycle characteristics and the like of the electrode were measured. Table 1 shows the results.

Example 3

The dried coke 1 used in Example 1 was adjusted by a bantam mill and Turboclassifier so as to have D50 of 17.5 μm. The crushed carbon material was filled in a graphite crucible with a screwed-cap.

Next, petroleum-based coke 1 which was crushed so as to have D50 of 17.5 μm was filled as filler 1 in an Acheson furnace for graphitizing artificial graphite electrodes. The graphite crucible was embedded in the filler of the Acheson furnace at depth of 30 cm. The distance from the bottom surface of the Acheson furnace to the bottom surface of the graphite crucible was 50 cm and the shortest distance from the side surface of the Acheson furnace to the side surface of the graphite crucible was 50 cm. By passing an electric current through the furnace and performing heat treatment at 3,100° C., a graphite material was obtained. The sample was measured for various physical properties and made into an electrode as described above and the cycle characteristics and the like of the electrode were measured. Table 1 shows the results.

Example 4

The dried coke 1 used in Example 1 was adjusted by a bantam mill and Turboclassifier so as to have D50 of 17.5 μm. The crushed carbon material was filled in a graphite crucible with a screwed-cap.

Next, petroleum-based coke 1 which was crushed so as to have D50 of 450 μm was filled as filler 2 in an Acheson furnace for graphitizing artificial graphite electrodes. The graphite crucible was embedded in the filler of the Acheson furnace at depth of 30 cm. By passing an electric current through the furnace and performing heat treatment at 3,100° C., a graphite material was obtained.

The sample was measured for various physical properties and made into an electrode as described above and the cycle characteristics and the like of the electrode were measured. Table 1 shows the results.

Example 5

The dried coke 1 used in Example 1 was adjusted by a bantam mill and Turboclassifier so as to have D50 of 17.5 μm. The resultant was used as Sample 1.

Next, petroleum-based coke 1 which was crushed so as to have D50 of 17.5 μm was filled as filler 1 in an Acheson furnace for graphitizing artificial graphite electrodes. Sample 1, without being filled in a container, was embedded in the space in the Acheson furnace at depth of 50 cm, which space corresponded to the position where the crucible of Example 1 was embedded. The distance from the Acheson furnace wall to the position in which the sample powder was embedded was measured so that the location could be identified at the time of collecting the powder after graphitization. By passing an electric current through the furnace and performing heat treatment at 3,100° C., a graphite material was obtained. The sample was measured for various physical properties and made into an electrode as described above and the cycle characteristics and the like of the electrode were measured. Table 1 shows the results.

Example 6

The dried coke 1 used in Example 1 was adjusted by a bantam mill and Turboclassifier so as to have D50 of 17.5 μm and used as Sample 1.

Next, petroleum-based coke 1 which was crushed so as to have D50 of 450 μm was filled as filler 1 in an Acheson furnace for graphitizing artificial graphite electrodes. The above-mentioned Sample 1, without being filled in a container, was embedded in the space in the Acheson furnace at depth of 30 cm, which space corresponded to the position where the crucible of Example 3 was embedded. The distance from the Acheson furnace wall to the position in which the sample powder was embedded was measured so that the location could be identified at the time of collecting the powder after graphitization. By passing an electric current through the furnace and performing heat treatment at 3,100° C., a graphite material was obtained. After collecting the graphite material, the sample was measured for various physical properties and made into an electrode as described above and the cycle characteristics and the like of the electrode were measured. Table 1 shows the results.

Example 7

The dried coke 1 used in Example 1 was adjusted by a bantam mill and Turboclassifier so as to have D50 of 17.5 μm. The crushed carbon material was filled in graphite crucible 3 (diameter of 3 cm and height of 10 cm) with a screw-cap. The crucible was placed in graphite crucible 4 (diameter of 10 cm and height of 20 cm) which was bigger than crucible 3, filler 1 of Example 1 was filled between the inner wall of crucible 4 and the outer wall of crucible 3 so that the thickness of the filler became 2 cm or more, and crucible 4 was closed up with a screwed-cap.

Next, crucible 4 containing crucible 3 was placed in a graphite heating furnace produced by Kurata Giken (height: 35 cm, width: 35 cm, length: 35 cm), and the atmosphere of the furnace was replaced with argon by vacuum substitution. Next, high-purity argon (purity of 99.99%) was circulated at a flow rate of 1 l/minute. In this state, the furnace was heated from room temperature to 3,100° C. in two hours and after the furnace was maintained at 3,100° C. for 20 minutes, the heating was stopped. After being cooled to room temperature, argon flow was stopped and crucible 3 was taken out from crucible 4, and the analysis of the graphite material sample was performed in the same manner as in Example 1. The results are shown in Table 1.

Comparative Example 1

The dried coke 1 used in Example 1 was adjusted by a bantam mill and Turboclassifier so as to have D50 of 17.5 μm. The crushed carbon material was filled in a graphite crucible with a screwed-cap.

Next, petroleum-based coke 1 which was crushed so as to have D50 of 17.5 μm was filled as filler 2 in an Acheson furnace for graphitizing artificial graphite electrodes. The graphite crucible was embedded in the filler of the Acheson furnace at depth of 10 cm. The distance from the bottom surface of the Acheson furnace to the bottom surface of the graphite crucible was 50 cm and the shortest distance from the side surface of the Acheson furnace to the side surface of the graphite crucible was 50 cm. By passing an electric current through the furnace and performing heat treatment at 3,100° C., a graphite material was obtained. The sample was measured for various physical properties and made into an electrode as described above and the cycle characteristics and the like of the electrode were measured. Table 1 shows the results.

Comparative Example 2

The dried coke 1 used in Example 1 was adjusted by a bantam mill and Turboclassifier so as to have D50 of 17.5 μm. The crushed carbon material was filled in a graphite crucible with a screwed-cap.

Next, petroleum-based coke 1 which was crushed so as to have D50 of 750 μm was filled as filler 2 in an Acheson furnace for graphitizing artificial graphite electrodes. The graphite crucible was embedded in the filler of the Acheson furnace at depth of 50 cm. The distance from the bottom surface of the Acheson furnace to the bottom surface of the graphite crucible was 50 cm and the shortest distance from the side surface of the Acheson furnace to the side surface of the graphite crucible was 50 cm. By passing an electric current through the furnace and performing heat treatment at 3,100° C., a graphite material was obtained. The sample was measured for various physical properties and made into an electrode as described above and the cycle characteristics and the like of the electrode were measured. Table 1 shows the results.

Comparative Example 3

The dried coke 1 used in Example 1 was adjusted by a bantam mill and Turboclassifier so as to have D50 of 17.5 μm. The resultant was used as Sample 1.

Next, petroleum-based coke 1 which was crushed so as to have D50 of 17.5 μm was filled as filler 1 in an Acheson furnace for graphitizing artificial graphite electrodes. Sample 1, without being filled in a container, was embedded in the space in the Acheson furnace at depth of 10 cm, which space corresponded to the position where the crucible of Comparative Example 1 was embedded. The distance from the Acheson furnace wall to the position in which the sample powder was embedded was measured so that the location could be identified at the time of collecting the powder after graphitization. By passing an electric current through the furnace and performing heat treatment at 3,100° C., a graphite material was obtained. The sample was measured for various physical properties and made into an electrode as described above and the cycle characteristics and the like of the electrode were measured. Table 1 shows the results.

Comparative Example 4

The dried coke 1 used in Example 1 was adjusted by a bantam mill and Turboclassifier so as to have D50 of 17.5 μm and used as Sample 1. Next, petroleum-based coke 1 which was crushed so as to have D50 of 750 μm was filled as filler 1 in an Acheson furnace for graphitizing artificial graphite electrodes. Sample 1, without being filled in a container, was embedded in the space in the Acheson furnace at depth of 50 cm, which space corresponded to the position where the crucible of Example 1 was embedded. The distance from the Acheson furnace wall to the position in which the sample powder was embedded was measured so that the location could be identified at the time of collecting the powder after graphitization. By passing an electric current through the furnace and performing heat treatment at 3,100° C., a graphite material was obtained. The sample was measured for various physical properties and made into an electrode as described above and the cycle characteristics and the like of the electrode were measured. Table 1 shows the results.

Comparative Example 5

Malagasy natural graphite was adjusted by a bantam mill and Turboclassifier so as to have D50 of 17.5 μm. The resultant was analyzed and evaluated in the same manner as in Example 1. Table 1 shows the results.

Comparative Example 6

The dried coke 1 used in Example 1 was adjusted by a bantam mill and Turboclassifier so as to have D50 of 17.5 μm. The crushed carbon material was filled in graphite crucible 3 (diameter of 3 cm and height of 10 cm) with a screw-cap.

Next, crucible 3 was placed in a graphite heating furnace produced by Kurata Giken (height: 35 cm, width: 35 cm, length: 35 cm), and the atmosphere of the furnace was replaced with argon by vacuum substitution. Next, high-purity argon (purity of 99.99%) was circulated at a flow rate of 1 l/minute. In this state, the furnace was heated from room temperature to 3,100° C. in two hours and after the furnace was maintained at 3,100° C., the heating was stopped. After being cooled to room temperature, argon flow was stopped and crucible 3 was taken out, and the analysis of the graphite material sample was performed in the same manner as in Example 1. The results are shown in Table 1.

Comparative Example 7

The dried coke 1 used in Example 1 was adjusted by a bantam mill and Turboclassifier so as to have D50 of 17.5 μm. The crushed carbon material was filled in graphite crucible 3 (diameter of 3 cm and height of 10 cm) with a screw-cap. The crucible was placed in graphite crucible 5 (diameter of 20 cm and height of 25 cm) which was bigger than crucible 3, filler 1 of Example 1 was filled between the inner wall of crucible 5 and the outer wall of crucible 3 so that the thickness of the filler became 5 cm or more, and crucible 5 was closed up with a screwed-cap.

Next, crucible 5 containing crucible 3 was placed in a graphite heating furnace produced by Kurata Giken (height: 35 cm, width: 35 cm, length: 35 cm), and the atmosphere of the furnace was replaced with argon by vacuum substitution. Next, high-purity argon (purity of 99.99%) was circulated at a flow rate of 1 l/minute. In this state, the furnace was heated from room temperature to 3,100° C. in two hours and after the furnace was maintained at 3,100° C. for 20 minutes, the heating was stopped. After being cooled to room temperature, argon flow was stopped and crucible 3 was taken out from crucible 5, and the analysis of the graphite material sample was performed in the same manner as in Example 1. The results are shown in Table 1.

TABLE 1

| Item | Unit | Ex. 1 | Ex. 2 | Ex. 3 | Ex. 4 | Ex. 5 | Ex. 6 | Ex. 7 | Comparative Ex. 1 |
|---|---|---|---|---|---|---|---|---|---|
| Filler particles (D50) | μm | 17.5 | 450 | 17.5 | 450 | 17.5 | 450 | 17.5 | 17.5 |
| Depth of embedment | cm | 50 | 50 | 30 | 30 | 50 | 30 | — | 10 |
| Thickness of filler | cm | — | — | — | — | — | — | 2 | — |
| crucible | | present | present | present | present | absent | absent | present | present |
| Surface oxygen concentration | mass % | 0.011 | 0.021 | 0.025 | 0.031 | 0.017 | 0.038 | 0.013 | 0.052 |
| Max. heat treatment temperature | ° C. | 3100 | 3100 | 3100 | 3100 | 3100 | 3100 | 3100 | 3100 |
| d002 | nm | 0.3362 | 0.3358 | 0.3363 | 0.3362 | 0.3364 | 0.3365 | 0.3368 | 0.3362 |
| Lc | nm | 72 | 83 | 85 | 79 | 82 | | | 73 |
| Aspect ratio | | 1.11 | 1.30 | 1.25 | 1.18 | 1.29 | 1.23 | 1.31 | 1.24 |
| Average particle diameter (D50) | μm | 17.2 | 18.1 | 17.9 | 16.8 | 17.1 | 17.2 | 17.8 | 17.3 |
| Specific surface area | m$^2$/g | 1.1 | 1.3 | 1.0 | 1.0 | 1.4 | 1.63 | 0.98 | 2.2 |
| Tap density (0 tapping) | g/cm$^3$ | 0.9 | 0.81 | 0.77 | 0.95 | 0.88 | 0.87 | 0.91 | 0.9 |
| Tap density (400 times) | g/cm$^3$ | 1.32 | 1.26 | 1.23 | 1.33 | 1.25 | 1.23 | 1.25 | 1.21 |
| Discharge capacity (0.1 C) | mAh/g | 332 | 339 | 330 | 333 | 328 | 328 | 327 | 329 |
| Initial efficiency | % | 95 | 94 | 93 | 93 | 94 | 93 | 94 | 89 |

| Item | Unit | Comparative Ex. 2 | Comparative Ex. 3 | Comparative Ex. 4 | Comparative Ex. 5 | Comparative Ex. 6 | Comparative Ex. 7 |
|---|---|---|---|---|---|---|---|
| Filler particles (D50) | μm | 750 | 17.5 | 750 | 750 | 750 | 17.5 |

TABLE 1-continued

| | | | | | | | |
|---|---|---|---|---|---|---|---|
| Depth of embedment | cm | 50 | 10 | 50 | 50 | — | — |
| Thickness of filler | cm | — | — | — | — | 0 | 5 |
| crucible | | present | absent | absent | absent | present | present |
| Surface oxygen concentration | mass % | 0.061 | 0.058 | 0.067 | 0.004 | 0.045 | 0.005 |
| Max. heat treatment temperature | °C. | 3100 | 3100 | 3100 | | 3100 | 3100 |
| d002 | nm | 0.3363 | 0.3361 | 0.3361 | 0.3357 | 0.3369 | 0.3368 |
| Lc | nm | 82 | 75 | 80 | 120 | 65 | 68 |
| Aspect ratio | | 1.12 | 1.35 | 1.35 | 3.85 | 1.33 | 1.29 |
| Average particle diameter (D50) | μm | 16.8 | 17.2 | 18.1 | 22.2 | 16.9 | 17.3 |
| Specific surface area | m$^2$/g | 2.4 | 4.2 | 5.5 | 4.8 | 1.11 | 0.8 |
| Tap density (0 tapping) | g/cm$^3$ | 0.87 | 0.79 | 0.84 | 0.45 | 0.9 | 0.91 |
| Tap density (400 times) | g/cm$^3$ | 1.3 | 1.25 | 1.19 | 0.88 | 1.29 | 1.34 |
| Discharge capacity (0.1 C) | mAh/g | 328 | 329 | 330 | 355 | 325 | 324 |
| Initial efficiency | % | 87 | 85 | 82 | 82 | 89 | 90 |

INDUSTRIAL APPLICABILITY

A graphite material in which the surface oxidation degree is controlled can be made into a negative electrode material for lithium secondary batteries which has a small irreversible capacity while maintaining large current load characteristics, cycle characteristics and a discharge capacity at a high level as the additive for the lithium ion secondary battery. The method for producing the graphite material is economically-efficient and suited to mass production, and the graphite material delivers excellent performance for large-size lithium secondary batteries which are expected to develop in future.

The battery or secondary battery using the graphite material as a negative electrode material has applicability in the field where conventional lead secondary batteries, nickel-cadmium secondary batteries and nickel-hydrogen secondary batteries were mainly used: e.g. electric tools such as an electric drill, hybrid electric vehicles (HEV) and electric vehicles (EV).

The invention claimed is:

1. A graphite material comprising crystallite graphite particles, wherein an oxygen amount (a) (mass %) in a region from a particle surface of the graphite material to a depth of 40 nm is within a range of $0.010 \leq (a) \leq 0.04$ as determined by a peak intensity of $O_{1s}$ obtained by HAX-PES measurement using a hard X-ray of 7,940 eV.

2. The graphite material as claimed in claim 1, wherein an average interplanar spacing $d_{002}$ of the crystallite is 0.3356 nm to 0.3375 nm and the thickness of the crystal in the C-axis direction (Lc) is from 50 to 100 nm measured by powder X-ray diffraction.

3. The graphite material as claimed in claim 1, wherein an average aspect ratio of the primary particles of the graphite material is 1 to 4.

4. The graphite material as claimed in claim 1, wherein the particles constituting the graphite material have an average volumetric-basis particle diameter (D50) of 3 to 20 μm as measured by laser diffraction and a BET specific surface area of 0.5 to 4 m$^2$/g.

5. The graphite material as claimed in claim 1, wherein the graphite material has a loose bulk density of 0.7 g/cm$^3$ or more and a powder density after tapping 400 times is 0.8 to 1.6 g/cm$^3$ or less.

6. A carbon material for battery electrodes comprising the graphite material claimed in claim 1.

7. A paste for electrodes comprising the carbon material for battery electrodes as claimed in claim 6 and a binder.

8. A battery comprising a molded body of the paste for electrodes as claimed in claim 7.

9. A lithium ion secondary battery comprising a molded body of the paste for electrodes as claimed in claim 7.

10. A method for producing the graphite material as claimed in claim 1, comprising pulverizing a carbon material having a maximum thermal history of 500 to 1,800° C. and subjecting the resulting pulverized product to graphitization treatment at 2,000 to 3,300° C., wherein the graphitization treatment is performed in an Acheson furnace using carbon particles or graphite particles having an average volumetric basis particle diameter (D50) of 2 to 500 μm as measured by laser diffraction as a filler in which the pulverized product is embedded; and a thickness of filler powder surrounding the pulverized product is 20 cm or more.

11. The method for producing the graphite material as claimed in claim 10, wherein the pulverized product is heated to 2,200 to 3,300° C. by the Joule heat generated by directly passing an electric current through the filler in the Acheson furnace.

12. The method for producing the graphite material as claimed in claim 10, wherein the pulverized product is filled in a graphite crucible and embedded in the filler.

13. The method for producing the graphite material as claimed in claim 10, wherein the pulverized product is embedded in the filler without being filled in a container.

14. A method for producing the graphite material claimed in claim 1, comprising pulverizing a carbon material having a maximum thermal history of 500 to 1,400° C. and subjecting the resulting pulverized product to graphitization treatment at 2,000 to 3,300° C., wherein the graphitization treatment is performed under an inert atmosphere in a graphite heating furnace by filling carbon particles or graphite particles having an average volumetric basis particle diameter (D50) of 2 to 500 μm as measured by laser diffraction in a graphite crucible as a filler and embedding the pulverized product in the center of the filler.

15. The method for producing the graphite material as claimed in claim 10, wherein the carbon material is obtained by subjecting a crude oil distilled residue, in which a total composition of an Asphaltene component and a resin component is 30 to 80 mass % and a sulfur part is 0.3 to 6 mass %, to delayed-coking with a heating furnace having a heater output temperature controlled to be 550° C. to 580° C. before introducing into a coke drum.

16. The method for producing the graphite material as claimed in claim 10, wherein the pulverized product is pre-heated at a temperature of 500 to 1,800° C. by an indirect heating method before the graphitization treatment.

17. The method for producing the graphite material as claimed in claim 10, wherein an average aspect ratio of the filler particle is 1.20 to 5.00.

\* \* \* \* \*